(12) United States Patent
Tipping et al.

(10) Patent No.: US 7,106,914 B2
(45) Date of Patent: Sep. 12, 2006

(54) BAYESIAN IMAGE SUPER RESOLUTION

(75) Inventors: Michael E. Tipping, Cambridge (GB); Christopher M. Bishop, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 790 days.

(21) Appl. No.: 10/375,397

(22) Filed: Feb. 27, 2003

(65) Prior Publication Data

US 2004/0170340 A1    Sep. 2, 2004

(51) Int. Cl.
G06K 9/32    (2006.01)

(52) U.S. Cl. .................................... 382/299
(58) Field of Classification Search ................. 382/299
See application file for complete search history.

(56) References Cited

U.S. PATENT DOCUMENTS

2006/0104540 A1 *    5/2006    Haussecker et al. ........ 382/276

FOREIGN PATENT DOCUMENTS

EP    0731600 A2 *    11/1996
EP    1492051 A2 *    12/2004

OTHER PUBLICATIONS

Park et al.; "Super-Resolution Image Reconstruction: A Technical Overview", IEEE Signal Processing Magazine, May 2003.*
M. E. Tipping and C. M. Bishop. "Bayesian image super-resolution." Advances in Neural Information Processing Systems 15, pp. 1279-1286. MIT Press, Cambridge, MA, 2003.*
Nguyen, Nhat; Milanfar, Peyman and Golub, Gene; "A Computationally Efficient Superresolution Image Reconstruction Algorithm"; IEEE Transactions on Image Processing v 10 n 4; Apr. 2001; pp. 573-583.
Smelyanskiy, V.N.; Cheeseman, P.; Maluf, D.A.; Morris, R.D.; "Bayesian Super-Resolved Surface Reconstruction from Images"; Proceedings CVPR, v 1, 2000; pp. 375-382.
Capel, David and Zisserman, Andrew; "Super-Resolution Enhancement of Text Image Sequences"; International Conference on Pattern Recognition; Barcelona, 2000; pp. 600-605.
Hardie, Russell C.; Barnard, Kenneth J.; Armstrong, Ernest E.; "Joint MAP Registration and High-Resolution Image Estimation Using a Sequence of Undersampled Images"; IEEE Transactions on Image Processing v 6 n12; Dec. 1997, pp. 1621-1633.
Baker, Simon and Kanade, Takeo; "Limits on Super-Resolution and How to Break Them"; IEEE Transactions on Patm Analysis and Machine Intelligence; 2002; 35 pages.
Bascle, B.; Blake, A.; Zisserman, A.; "Motion Deblurring and Super-Resolution from an Image Sequence" Proceeding of the Fourth European Conference on Computer Vision; Cambridge England 1996; pp. 573-581.

(Continued)

*Primary Examiner*—Joseph Mancuso
*Assistant Examiner*—Jordan Kuhn
(74) *Attorney, Agent, or Firm*—Microsoft Corporation

(57) ABSTRACT

An image super resolution system computes a high resolution image of a target from multiple low resolution images of the same target. Each low resolution image differs slightly in perspective from each of the other low resolution images. A coarse registration operation determines initial estimates of registration parameters (e.g., representing shifts and rotation in perspective) associated with each low resolution image. A fine registration operation improves the initial estimates using Bayesian analysis to infer the registration parameters and an acuity parameter. As such, a marginal likelihood of the low resolution images is optimized to determine the improved estimates of the registration parameters and the acuity parameter, which are used to solve for the high resolution image.

15 Claims, 5 Drawing Sheets

OTHER PUBLICATIONS

Nabney; I.T.; "Netlab: Algorithms for Pattern Recognition"; Springer, London, 2002 http://www.ncrg.aston.ac.uk/netlab/; 2 pages.

Bishop, Christopher M.; "Neural Networks for Pattern Recognition"; Forward by Geoffrey Hinton; Jan. 1996; 7 pages; ISBN # 0198538642.

* cited by examiner

BAYESIAN IMAGE SUPER RESOLUTION

TECHNICAL FIELD

The invention relates generally to image processing, and more particularly to improving image resolution.

BACKGROUND

Digital cameras are useful in both consumer and professional contexts. Generally, digital cameras can capture a digital image of a subject or scene. The captured image may then be transferred to a computer system for display, inserted as a graphical object into an electronic document, stored in a storage device, or output to a printing device, among other actions. In addition, there are other means of generating a digital image, such as by scanning hard copy photographs, etc.

Is In many digital cameras, the digital image capture operation is performed by a CCD (charged coupled device) array, in which individual CCDs, or distinct groups of CCDs, represent individual pixels of a captured image. The resolution of the camera is dependent upon the density of the CCDs in the array. Furthermore, while CCDs are prevalent, other digital image capture devices may alternatively be employed, such as drum scanners.

A variety of camera capabilities are available at a variety of prices points. One important camera feature that can significantly impact the cost of a digital camera is its resolution. Higher density CCD arrays, which provide higher resolution image capture, are more expensive than lower density CCD arrays. In other digital image capture devices, such as scanning devices, higher resolution also generally translates into higher cost. Nevertheless, many users wish to find a camera or other digital image capture device that provides high resolution images at a low price.

SUMMARY

Implementations described and claimed herein solve the discussed problems using a Bayesian image super resolution method that computes a high resolution image of a target from multiple low resolution images of the same target. Each low resolution image differs slightly in perspective from each of the other low resolution images. A coarse registration operation determines initial estimates of registration parameters (e.g., representing shifts and rotation in perspective) associated with each low resolution image. A fine registration operation improves the initial estimates of the registration parameters and an acuity parameter using Bayesian analysis to infer the parameters. As such, a marginal likelihood of the low resolution images is optimized to determine the improved estimates of the registration parameters and the acuity parameter, which are used then to solve for the high resolution image.

In some implementations, articles of manufacture are provided as computer program products. One implementation of a computer program product provides a computer program storage medium readable by a computer system and encoding a computer program that computes a high resolution image of a target from multiple low resolution images taken of the target by an image capture device. Another implementation of a computer program product may be provided in a computer data signal embodied in a carrier wave by a computing system and encoding the computer program that computes a high resolution image of a target from multiple low resolution images taken of the target by an image capture device.

The computer program product encodes a computer program for executing on a computer system a computer process for computing a high resolution image of a target from multiple low resolution images taken of the target by an image capture device. Each low resolution image has at least one difference in perspective relative to the target as compared to each other low resolution image. Each difference in perspective is represented by a registration parameter. A marginal likelihood associated with the low resolution images is optimized to determine estimates of the registration parameters and the acuity parameter. The marginal likelihood is dependent upon registration parameters of the low resolution images and an acuity parameter associated with the image capture device. The marginal likelihood is also is independent of the high resolution image. A mean of a posterior distribution associated with the high resolution image is computed using the estimates of the one or more registration parameters and the acuity parameter to determine the high resolution image.

In another implementation, a method of computing a high resolution image of a target from multiple low resolution images taken of the target by an image capture device is provided. Each low resolution image has at least one difference in perspective relative to the target as compared to each other low resolution image. Each difference in perspective is represented by a registration parameter. A marginal likelihood associated with the low resolution images is optimized to determine estimates of the registration parameters and the acuity parameter. The marginal likelihood is dependent upon registration parameters of the low resolution images and an acuity parameter associated with the image capture device. The marginal likelihood is also independent of the high resolution image. A mean of a posterior distribution associated with the high resolution image is computed using the estimates of the one or more registration parameters and the acuity parameter to determine the high resolution image.

In yet another implementation, a system for computing a high resolution image of a target from multiple low resolution images taken of the target by an image capture device is provided. Each low resolution image has at least one difference in perspective relative to the target as compared to each other low resolution image. Each difference in perspective is represented by a registration parameter. A fine registration module optimizes a marginal likelihood associated with the low resolution images. The marginal likelihood is dependent upon registration parameters of the low resolution images and an acuity parameter associated with the image capture device. The marginal likelihood is also independent of the high resolution image to determine estimates of the registration parameters and the acuity parameter. A high resolution inference module computes a mean of a posterior distribution associated with the high resolution image using the estimates of the one or more registration parameters and the acuity parameter to determine the high resolution image.

DETAILED DESCRIPTION OF THE INVENTION

A Bayesian image super resolution system computes a high resolution image of a target from multiple low resolution images of the same target. Each low resolution image differs slightly in perspective from each of the other low resolution images. A coarse registration operation determines initial estimates of registration parameters (e.g., representing shifts and rotation in perspective) associated with each low resolution image. A fine registration operation improves the initial estimates using Bayesian analysis to infer the registration parameters and an acuity parameter. As such, a marginal likelihood of the low resolution images is optimized to determine the improved estimates of the registration parameters and the acuity parameter, which are used to solve for the high resolution image.

Figure 1:
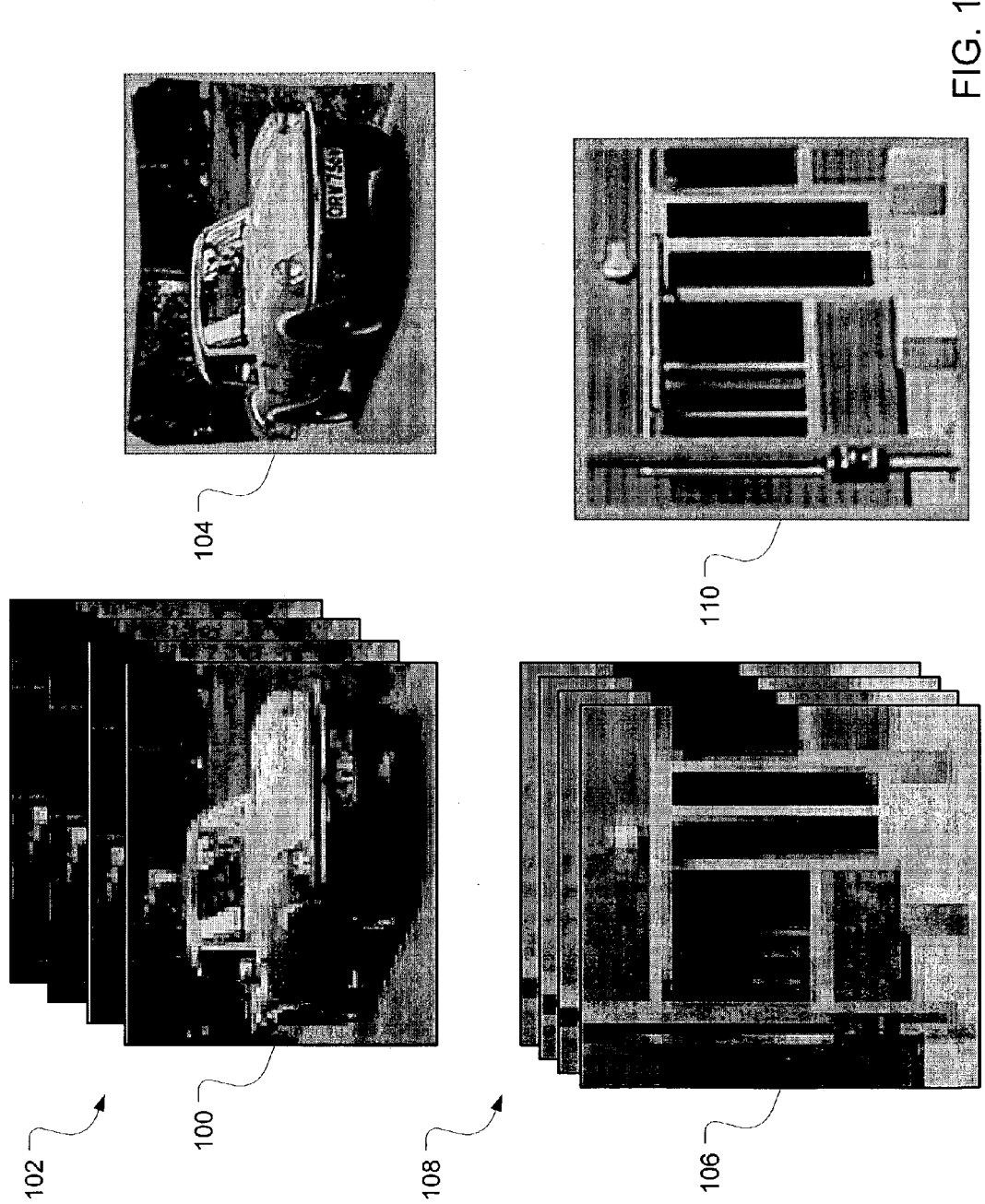
FIG. 1 illustrates two sets of low resolution source images and two corresponding high resolution result images.

FIG. 1 illustrates two sets of low resolution source images and two corresponding high resolution, result images. A first low resolution image 100 is one of multiple (e.g., 16) low resolution images 102 captured by a digital camera. Individual multiple low resolution images are taken with slight variations in camera rotation and/or position (i.e., differences in perspective). For example, between each image capture, the user's hands are likely to shift or tilt such that, while each individual image is depicts the same subject or scene (i.e., "target"), the exact perspective of the target is slightly different than each other individual image. Alternatively, the camera may be designed to vary its perspective mechanically or optically. The corresponding high resolution image 104 is a result of super resolution processing of the low resolution images using a Bayesian technique.

Likewise, a second low resolution image 106 is one of multiple low resolution images 108 captured by a digital image capture device. Each low resolution image of the target is slightly different in perspective from any other low resolution image of the target. The corresponding high resolution image 110 is a result of super resolution processing of the low resolution images using a Bayesian technique. It should be understood that digital image capture devices may also include video camera, such that individual video frames provide the multiple low resolution images.

Figure 2:
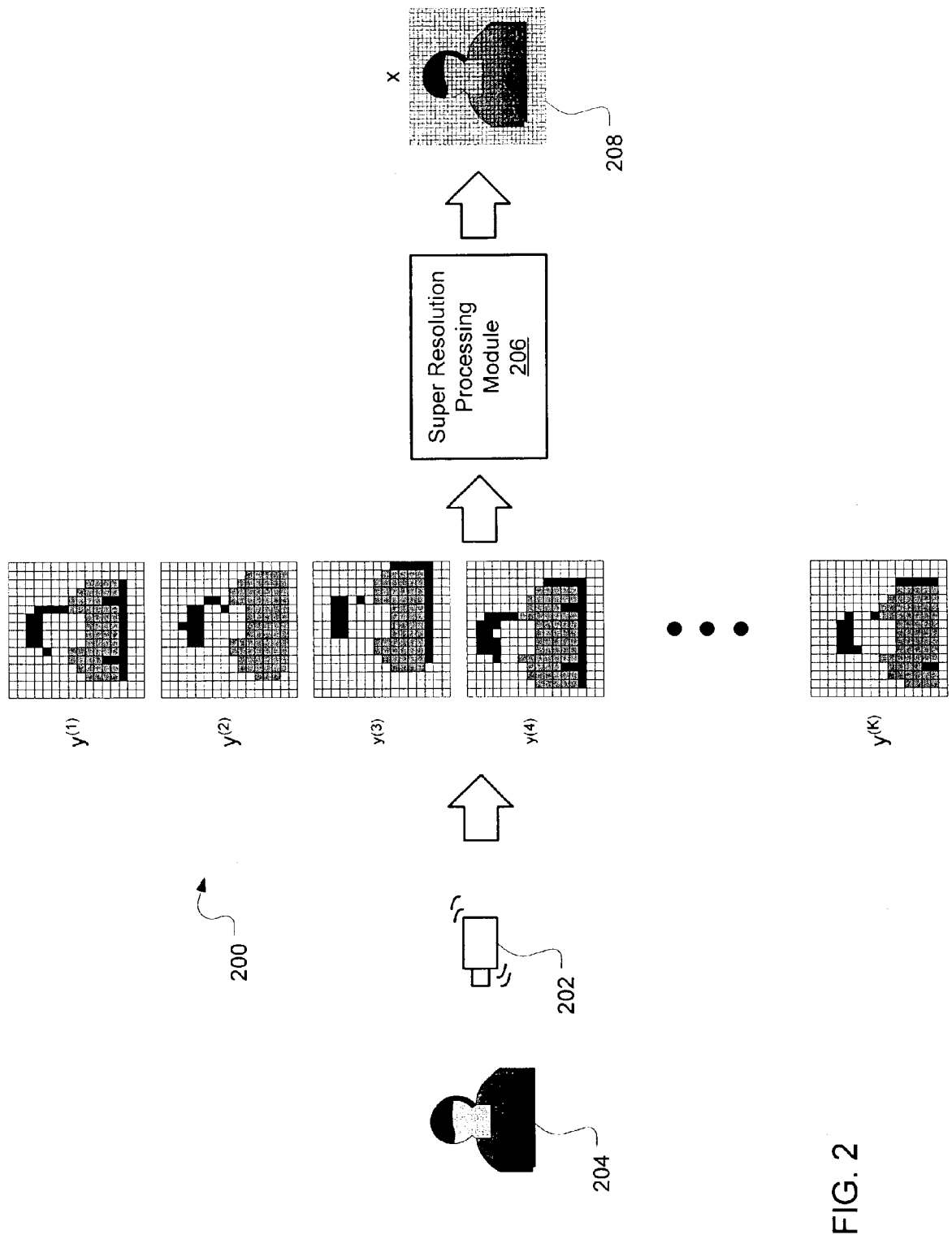
FIG. 2 illustrates operation of an exemplary image super resolution system.

FIG. 2 illustrates operation of an exemplary image super resolution system. Multiple low resolution images 200 (represented by matrices $y^{(1)}$ through $y^{(K)}$) of target 202 are captured by a digital capture device 204 (e.g., a digital camera). Each low resolution image 200 includes a representation of the target from a slightly different perspective. For example, the target in image $y^{(2)}$ is positioned a little higher and a little farther to the right in the image frame than the target in image $y^{(1)}$. This offset represents an example of a shift along two axes. Likewise, rotations may introduce changes of perspective as well. It should be understood that the differences in perspective discussed above do not limit the possible changes in perspective that may be supported in various implementation. Other differences in perspective may include without limitation shifts along three axes and rotations on three axes.

The low resolution images 200 are input to a super resolution processing module 206, which uses the low resolution images 200 and Bayesian analysis to generate a high resolution (i.e., higher than the resolution of the low resolution images 200) image 208 (represented by matrix x). Effectively, the super resolution processing module 206 uses the distribution of image data in the low resolution images 200 to estimate the most likely high resolution representation corresponding to the low resolution images, given unknown registration parameters for shifting and rotation.

Figure 3:
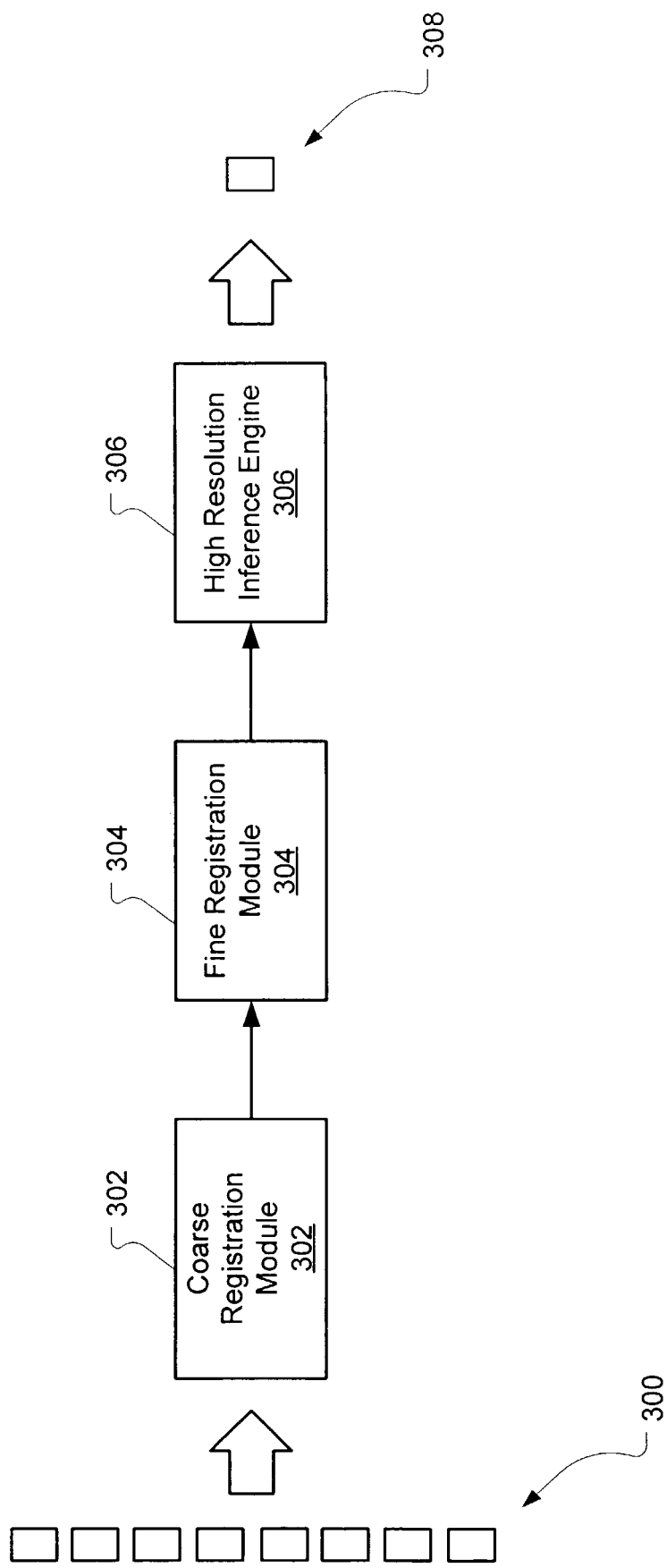
FIG. 3 illustrates an exemplary system for generating a higher resolution result image.

FIG. 3 illustrates an exemplary system for generating a higher resolution result image. Multiple low resolution images 300 are input to a coarse registration module 302, which coarsely determines the differences in perspective among the multiple low resolution images 300. These differences in perspective are reflected by registration parameters, such as $s_k$ representing shifts and $\theta_k$ representing rotations. Coarse registration (e.g., registration to within the nearest low resolution pixel) may be accomplished by a number of methods, including manual or algorithmic alignment. Other coarse registration methods, including variations of those specifically discussed herein, are also contemplated. For example, in one implementation, a reference image is selected from the low resolution images, and, for each other low resolution image, the shift parameters are adjusted within some reasonable range of whole pixels (e.g., plus/minus two pixels) and the shift registration parameter is selected that minimizes the error (e.g., the sum-of-squared pixel differences) between the reference image and each of the other low resolution images.

The low resolution images 300 and the registration parameters are input to a fine registration module 304, which computes more accurate estimates of the registration parameters. An exemplary operation of a fine registration module is described in more detail below. The registration parameters generated by the fine registration module 302 are input to a high resolution inference module 306 to compute the high resolution image 308.

An exemplary implementation of a Bayesian super-resolution system is based on a generative model for observed low resolution images. To establish a context for notation in this description, a set of K low-resolution intensity images is represented by vectors $y^{(k)}$ of length M, where k=1, 2, 3, . . . , K. Such vectors may be obtained by raster scanning the pixels of the images or by other known means. It should also be understood that the described embodiment may be extended to multiple color images within in the scope of the present invention (e.g., employing vectors describing intensities of individual color channels). Each image is shifted, rotated, and/or zoomed (referred to as "differences in perspective") relative to a reference image, which is arbitrarily identified as $L^{(1)}$. The shifts are described by 2-dimensional vectors $s_k$. The rotations are described by angles $\theta_k$. Other general geometric transformations, such as zooming (i.e., shifting along the third axis) and rotation on vertical and lateral axes, are also contemplated. An exemplary super resolution system outputs a high resolution image (i.e., having a higher resolution than the low resolution images), represented by a raster-scan vector x having a length N, where N>>M.

Generally, Bayesian analysis refers to a statistical procedure that endeavors to estimate unknown parameters of an underlying distribution based on an observed distribution. A "prior" distribution, which may be based on anything including an assessment of the relative likelihoods of parameters or the results of non-Bayesian observations, is also used in Bayesian analysis. In practice, it is common to assume a uniform distribution over the appropriate range of values for the prior distribution, although other distributions, such as a Gaussian distribution, may also be used.

Given the prior distribution, data for an observed distribution is collected and the likelihood of the observed distribution as a function of parameter values is calculated.

"Likelihood" is the hypothetical probability that an event which has already occurred would yield a specific outcome. The likelihood function is multiplied by the prior distribution and normalized to obtain a unit probability over all possible values, referred to as the posterior distribution. The "mode" (i.e., the most commonly occurring value) in the posterior distribution yields the parameter estimate.

In one embodiment, a domain-independent prior distribution over the high resolution image may be represented by a Gaussian function $$p(x)=N(x|0,Z_x) \quad (1)$$

where the mean of the Gaussian function is 0 and the covariance matrix $Z_x$ is chosen to be of the form $$Z_x(i,j) = Ae^{-\left(\frac{\|v_i-v_j\|^2}{r^2}\right)} \quad (2)$$

In equation (2), $v_i$ represents the spatial position in the 2-dimensional image space of pixel i, the coefficient A represents the "strength" of the prior p(x), and r represents the correlation length scale.

Conceptually, the low resolution images may be considered to be generated from the high resolution by a transformation—by first applying a shift and a rotation, then convolving with some point spread function, and then downsampling to the lower resolution. Equation (3), in conjunction with equations (4)–(7), expresses such a transformation:

$$y^{(k)}=W^{(k)}x+\epsilon^{(k)} \quad (3)$$

where $\epsilon^{(k)}$ represents a vector of independent Gaussian random variables $p(\epsilon_i)=N(0,\beta)$, with zero mean and precision (i.e., inverse variance) $\beta$, representing noise terms intended to model the camera noise as well as to capture any discrepancy between the generative model and the observed data.

The transformation matrix $W^{(k)}$ is represented by a point spread function that captures the down-sampling process, yielding the Gaussian form $$W_{ji}^{(k)} = \tilde{W}_{ji}^{(k)} \left| \sum_{i'} \tilde{W}_{ji'}^{(k)} \right. \text{ with} \quad (4)$$

$$\tilde{W}_{ji'}^{(k)} = e^{-\frac{\|v_i-u_j^{(k)}\|^2}{\gamma^2}} \quad (5)$$

where j=1, 2, 3, ..., M and i=1, 2, 3, ..., N. The acuity parameter $\gamma$ represents the "width" of the point spread function (PSF), which approximates the combined effects of down-sampling and smoothing implemented by the camera optical system. The PSF can be determined from the low resolution image data. Conceptually, the acuity parameter relates the maximum sharpness that may be achieved in the high resolution image, given the characteristics of the low resolution image. In Equation (5), the vector $u_j^{(k)}$ is dependent upon the shift and the rotation of the low resolution image. Therefore, parameterization is chosen in which the center of rotation coincides with the center $\bar{v}$ of the image (although any other center of rotation is valid), such that $$u_j^{(k)}=R^{(k)}(v_j-\bar{v})+\bar{v}+s_k \quad (6)$$

where $R^{(k)}$ represents the rotation matrix $$R^{(k)} = \begin{pmatrix} \cos\theta_k & \sin\theta \\ -\sin\theta_k & \cos\theta_k \end{pmatrix}. \quad (7)$$

Therefore, the likelihood function for a low resolution image as a function of the high resolution image is of the form:

$$p(y^{(k)}|x,s_k,\theta_k,\gamma) = \left(\frac{\beta}{2\pi}\right)^{\frac{M}{2}} e^{-\frac{\beta}{2}\|y^{(k)}-W^{(k)}x\|^2} \quad (8)$$

Assuming that the images are generated independently from the model, Bayes Rule yields the posterior distribution of the high resolution image of the form:

$$p(x|\{y^{(k)},s_k,\theta_k\}\gamma) = \frac{p(x)\prod_{k=1}^{K} p(y^{(k)}|x,s_k,\theta_k,\gamma)}{p(\{y^{(k)}\}|\{s_k,\theta_k\},\gamma)} \quad (9)$$

$$= N(\mu,\sum) \quad (10)$$

with $$\sum = \left[Z_x^{-1} + \beta\left(\sum_{k=1}^{K} W_k^T W^{(k)}\right)\right]^{-1} \text{ as the covariance, and} \quad (11)$$

$$\mu = \beta \sum \left(\sum_{k=1}^{K} W_k^T y^{(k)}\right) \text{ as the mean (and the maximum).} \quad (12)$$

In Equation (9), the prior factor p(x) has been defined in Equation (1). Given known registration parameters $\{s_k,\theta_k\}$, the mean $\mu$ of the posterior distribution represents the super-resolved image. However, the factor $\Pi_{k=1}^{k} p(y^{(k)}|x,s_k,\theta_k,\gamma)$ and, hence, the mean $\mu$, are functions of both the registration parameters $(s_k,\theta_k)$ and the high resolution image x, which are unknown in the described implementation. Furthermore, merely optimizing the posterior distribution $p(x|\{y^{(k)},s_k,\theta_k\},\gamma)$ for the high resolution image as the registration parameters $(s_k,\theta_k)$ and the high resolution image are all varied yields significant errors.

Therefore, a Bayesian approach may be used to integrate out the unknown high resolution image x from the joint distribution of the high resolution image and the low resolution images:

$$\int \Pi_{k=1}^{k} p(y^{(k)}|x,s_k,\theta_k,\gamma)p(x)dx=p(\{y^{(k)}\}|\{s_k,\theta_k\},\gamma). \quad (13)$$

Therefore, the marginal likelihood for the low resolution images is in the form:

$$p(y|\{s_k,\theta_k\},\gamma)=N(0,Z_y) \quad (14)$$

where $$Z_y=\beta^{-1}I+WZ_xW^T, \quad (15)$$

and y and W are the vector and matrix of stacked $y^{(k)}$ and $W_k$ respectively.

Optimizing for Equation (14) is computationally intense, perhaps prohibitively so, for large dimensional matrices.

Therefore, matrix manipulations yield a more manageable marginal likelihood in the form:

$$\log p(y | \{s_k, \theta_k\}, \gamma) = -\frac{1}{2}\left[\beta \sum_{k=1}^{K} \|y^{(k)} - W^{(k)}\mu\|^2 + \mu^T Z_x^{-1}\mu + \log|Z_x| - \log|\sum| - KM \log \beta\right]. \quad (16)$$

The marginal likelihood representation in Equation (16) is a function of the registration parameters $\{s_k,\theta_k\}$ and the SPF parameter $\gamma$. Therefore, the marginal likelihood and the gradient of the marginal likelihood may be iteratively solved as the registration parameters $\{s_k, \theta_k\}$ and the SPF parameter $\gamma$ are varied so as to optimize marginal likelihood. In one implementation, initial estimates of these parameters are received from a coarse registration module, although initial estimates may be received from other sources. The optimization of $p(y|\{s_k,\theta_k\},\gamma)$ yields improved (e.g., sub-pixel) estimates of the acuity parameter and the registration parameters, as compared to the coarse tuning operation. Therefore, the mean of the posterior distribution $\mu$ in Equation 12 may be solved using the estimates to yield the high resolution image x.

Optimization may include a variety of operations yielding optimal and sub-optimal results. For example, in one implementation, minimizing to an optimal solution may yield the best visual results. However, an alternative implementation may yield acceptable results by minimizing to within a given threshold or optimizing to a specified value or range.

In one implementation, the marginal likelihood is optimized with respect to the registration parameters $\{s_k,\theta_k\}$ and the SPF parameter $\gamma$ using the scaled conjugate gradients algorithm (SCG), described in more detail in I. T. Nabney, *Netlab: Algorithms for Pattern Recognition*, Springer, London, 2002. http://www.ncrg.aston.ac.uk/netlab/, incorporated herein by reference for its teaching of the SCG.

In another implementation, the marginal likelihood is optimized with the registration parameters $\{s_k,\theta_k\}$ and the SPF parameter $\gamma$ using the expectation-maximization (EM) algorithm. In the E-step of the EM algorithm, the posterior distribution is evaluated over the high resolution image given by equation (10). In the M-step of the EM algorithm, the expectation of x of the log of the complete data likelihood $p(y |\{s_k,\theta_k\},\gamma)$ obtained from the product of the prior (1) and the likelihood (8) is maximized. The complete high resolution image is then computed as the mode of the full posterior distribution, obtained iteratively by maximizing the numerator in (9) using the SCG optimization.

Figure 4:
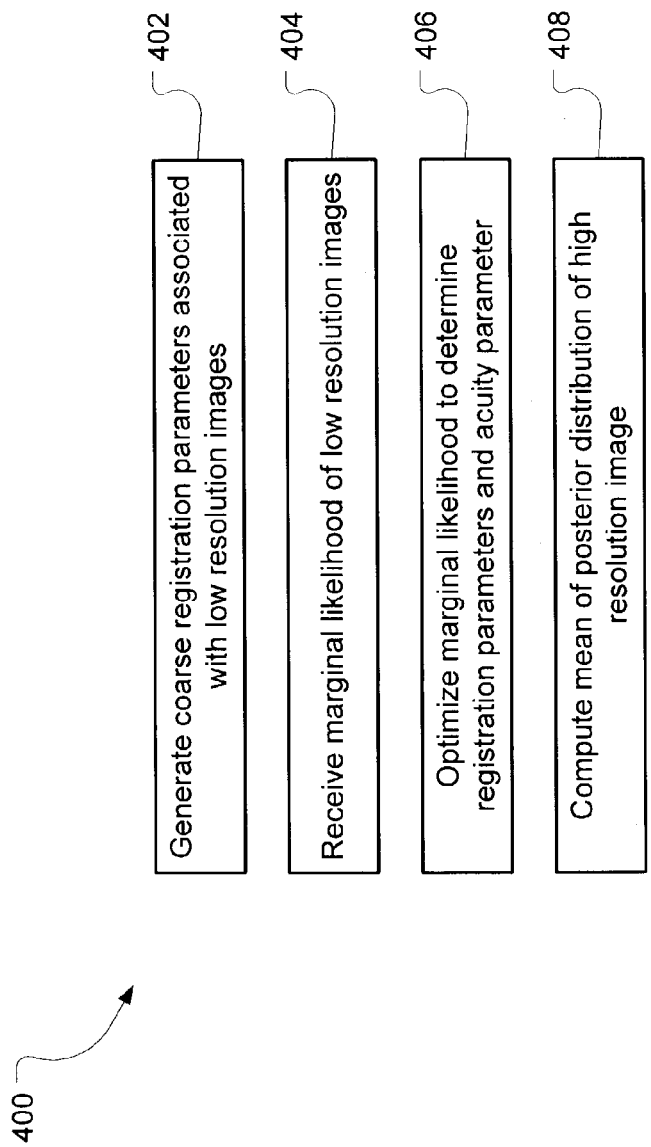
FIG. 4 illustrates exemplary operations for generating a higher resolution image.

FIG. 4 illustrates exemplary operations 400 for generating a higher resolution image. A coarse registration operation 402 generates initial estimates of registration parameters associated with the multiple low resolution images that are to be used in generating the high resolution image.

A likelihood operation 404 receives a marginal likelihood definition, such as by accessing the marginal likelihood definition from computer memory. The marginal likelihood definition has been determined to be dependent on one or more registration parameters and an acuity parameter. However, in one implementation, the marginal likelihood definition has also been determined using a Bayesian technique to integrate out dependence on the resulting high resolution image. Therefore, the likelihood may be solved and thus optimized, without regard to the high resolution image, according to the registration parameters and the acuity parameter in a fine registration operation 406. The fine registration operation 406 also receives the low resolution image data as input. The values of the registration parameters and the acuity parameter determined by the fine registration operation 406 to optimize the marginal likelihood may then be used to compute the high resolution image in an inference operation 406. For example, given estimates of fine registration parameters and the acuity parameter, the high resolution image may be computed using the mean $\mu$ (as shown in Equation (12)) of the posterior distribution $p(x |\{y^{(k)},s_k,\theta_k\},\gamma)$ (as shown in Equation (9)) of the high resolution image.

Figure 5:
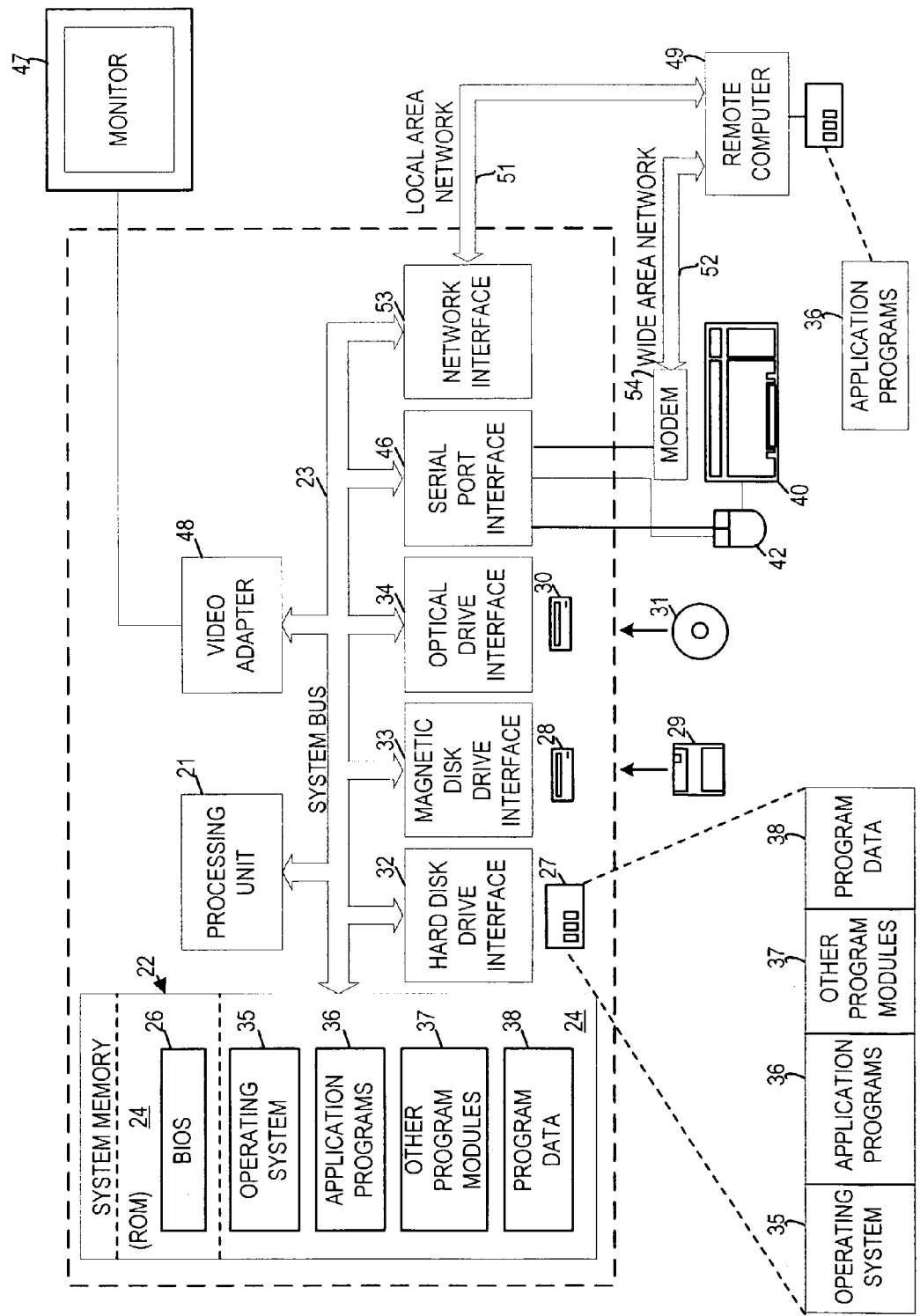
FIG. 5 illustrates an exemplary system useful for implementing an embodiment of the present invention.

The exemplary hardware and operating environment of FIG. 5 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a coarse registration module module, a fine resolution module, or a high resolution inference module may be incorporated as part of the operating system 35, application programs 36, or other program modules 37. The parameter estimates, low resolution image data, and high resolution data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method of computing a high resolution image of a target from multiple low resolution images taken of the target by an image capture device, each low resolution image having at least one difference in perspective relative to the target as compared to each other low resolution image, each difference in perspective being represented by a registration parameter, the method comprising:

optimizing a marginal likelihood associated with the low resolution images that is dependent upon one or more registration parameters of the low resolution images and an acuity parameter associated with the image capture device and is independent of the high resolution image to determine estimates of the one or more registration parameters and the acuity parameter;

computing a mean of a posterior distribution associated with the high resolution image using the estimates of the one or more registration parameters and the acuity parameter to determine the high resolution image.

2. The method of claim 1 wherein the at least one difference of perspective results from a shift of the image capture device.

3. The method of claim 1 wherein the at least one difference of perspective results from a rotation of the image capture device.

4. The method of claim 1 wherein the marginal likelihood is determined by a Bayesian technique that integrates out dependence of the marginal likelihood on the high resolution image.

5. The method of claim 1 further comprising:

determining initial estimates using coarse registration of the low resolution images to initialize the optimizing operation.

6. A computer program storage medium readable by a computer system encoding a computer program for executing on a computer system a computer process for computing a high resolution image of a target from multiple low resolution images taken of the target by an image capture device, each low resolution image having at least one difference in perspective relative to the target as compared to each other low resolution image, each difference in perspective being represented by a registration parameter, the computer process comprising:

optimizing a marginal likelihood associated with the low resolution images that is dependent upon one or more registration parameters of the low resolution images and an acuity parameter associated with the image capture device and is independent of the high resolution image to determine estimates of the one or more registration parameters and the acuity parameter;

computing a mean of a posterior distribution associated with the high resolution image using the estimates of the one or more registration parameters and the acuity parameter to determine the high resolution image.

7. The computer program storage medium of claim 6 wherein the at least one difference of perspective results from a shift of the image capture device.

8. The computer program storage medium of claim 6 wherein the at least one difference of perspective results from a rotation of the image capture device.

9. The computer program storage medium of claim 6 wherein the marginal likelihood is determined by a Bayesian technique that integrates out dependence of the marginal likelihood on the high resolution image.

10. The computer program storage medium of claim 6 wherein the computer process further comprises:

determining initial estimates using coarse registration of the low resolution images to initialize the optimizing operation.

11. A system for computing a high resolution image of a target from multiple low resolution images taken of the target by an image capture device, each low resolution image having at least one difference in perspective relative to the target as compared to each other low resolution image, each difference in perspective being represented by a registration parameter, the system comprising:

a fine registration module optimizing a marginal likelihood associated with the low resolution images that is dependent upon one or more registration parameters of the low resolution images and an acuity parameter associated with the image capture device and is independent of the high resolution image to determine estimates of the one or more registration parameters and the acuity parameter;

a high resolution inference module computing a mean of a posterior distribution associated with the high resolution image using the estimates of the one or more registration parameters and the acuity parameter to determine the high resolution image.

12. The system of claim 11 wherein the at least one difference of perspective results from a shift of the image capture device.

13. The system of claim 11 wherein the at least one difference of perspective results from a rotation of the image capture device.

14. The system of claim 11 wherein the marginal likelihood is determined by a Bayesian technique that integrates out dependence of the marginal likelihood on the high resolution image.

15. The system of claim 11 further comprising:

a coarse registration module determining initial estimates using coarse registration of the low resolution images to initialize the optimizing operation.

\* \* \* \* \*